(12) United States Patent
Simeone et al.

(10) Patent No.: US 6,928,830 B1
(45) Date of Patent: Aug. 16, 2005

(54) LINEARLY ACTUATED MANUAL FRESH AIR EXCHANGE

(75) Inventors: Robert S. Simeone, Bridgeport, NY (US); Yiming Yu, Jamesville, NY (US); Mark J. Perkovich, Fayetteville, NY (US)

(73) Assignee: Carrier Corporation, Farmington, CT (US)

( * ) Notice: Subject to any disclaimer, the term of this patent is extended or adjusted under 35 U.S.C. 154(b) by 36 days.

(21) Appl. No.: 10/901,604

(22) Filed: Jul. 29, 2004

(51) Int. Cl.⁷ .......................................... F25B 47/00
(52) U.S. Cl. ........................ 62/277; 62/194; 62/278
(58) Field of Search .................... 62/173, 180, 190, 62/239, 244, 412, 197, 204, 277, 278, 513

(56) References Cited

U.S. PATENT DOCUMENTS

| | | | |
|---|---|---|---|
| 3,335,576 A * | 8/1967 | Phillips ....................... | 62/156 |
| 3,861,167 A * | 1/1975 | Nijo .............................. | 62/209 |
| 4,045,972 A * | 9/1977 | Tyree, Jr. ..................... | 62/156 |
| 4,566,288 A * | 1/1986 | O'Neal ....................... | 62/196.1 |
| 5,090,209 A | 2/1992 | Martin | |
| 5,205,347 A | 4/1993 | Hughes | |
| 5,265,437 A * | 11/1993 | Saperstein et al. ............ | 62/243 |
| 5,458,188 A * | 10/1995 | Roehrich et al. ............. | 165/64 |
| 5,611,214 A | 3/1997 | Wegeng et al. | |
| 5,622,219 A | 4/1997 | Voss et al. | |
| 5,811,062 A | 9/1998 | Wegeng et al. | |
| 6,126,723 A | 10/2000 | Drost et al. | |
| 6,148,635 A | 11/2000 | Beebe et al. | |
| 6,311,507 B1 | 11/2001 | Gameiro | |
| 6,434,955 B1 | 8/2002 | Ng et al. | |
| 6,550,270 B2 | 4/2003 | Rudick | |
| 6,622,519 B1 | 9/2003 | Mathias et al. | |
| 6,630,012 B2 | 10/2003 | Wegeng et al. | |
| 6,694,765 B1 * | 2/2004 | Waldschmidt et al. ........ | 62/234 |
| 6,698,212 B2 * | 3/2004 | Viegas et al. ................ | 62/50.2 |
| 2003/0140638 A1 | 7/2003 | Arshansky et al. | |
| 2004/0103681 A1 * | 6/2004 | Aflekt et al. ................... | 62/278 |

FOREIGN PATENT DOCUMENTS

| | | |
|---|---|---|
| JP | 200217069 A | 4/2002 |
| JP | 2002243350 A | 8/2002 |

* cited by examiner

*Primary Examiner*—Melvin Jones

(57) ABSTRACT

A refrigeration unit is provided with a manually operated fresh air vent made up of a cap assembly and a handle assembly which move together in a linear/axial direction. The handle assembly is rotatable to change the position of the fresh air vent. The fresh air vent controls both the providing of fresh air to the circulating air in the trailer and the exhausting of a portion of the circulating air. The evaporator fan is run continuously when the air vent is open to prevent the build up of gases produced by the perishable cargo.

5 Claims, 8 Drawing Sheets

CLOSED
50%
OPEN
HANDLE POSITION

LINEARLY ACTUATED MANUAL FRESH AIR EXCHANGE

BACKGROUND OF THE INVENTION

Trailer refrigeration units are controlled by a microprocessor which receives inputs indicating the temperature, humidity, etc. in the conditioned space and controls the refrigeration system responsive to the inputs. Additionally, the microprocessor records the inputs such that the history of the load during the trip is recorded. Accordingly, it is possible to determine when and why a load is spoiled, thawed or the like. Perishable cargo such as fruit, vegetables and flowers produce, and are affected by, gases. Ethylene, for example, is produced in the ripening of bananas and its presence promotes ripening while respiration of the "live" cargo produces carbon dioxide and requires oxygen. It is therefore preferable to introduce some fresh air with the recirculating air, where perishable cargo is present, if spoilage or premature ripening of the load is to be avoided.

In a trailer, the load normally occupies much of the available space such that the flow paths for the conditioned air are located in the space between the load and the trailer ceiling, walls, floor, and the channels defined by the pallets on which the load sits. To minimize the wastage of conditioned space, only the expansion device, the evaporator, the evaporator fan, necessary ducting and sensors are located in the conditioned space. The rest of the refrigeration unit and its controls are located on the exterior of the trailer and are powered by an external power supply such as a diesel engine or the unit may be connected to the electric grid.

SUMMARY OF THE INVENTION

In the present invention a manually operated fresh air vent is provided to introduce some ambient/fresh air into the air circulating in the trailer and to exhaust some air from the trailer such as is done to provide some fresh air in commercial buildings. When the evaporator fan is running and the fresh air vent is open, the pressure differential across the evaporator fan is used to draw in fresh air and to exhaust stale air. The fresh air vent of the present invention has an open position, a closed position and one, or more, intermediate positions.

It is an object of this invention to discretely position a manually actuated vent.

It is another object of this invention to selectively provide a continuous supply of fresh air to a perishable cargo.

It is a further object of this invention to provide a manually actuated vent which requires no mechanical calibration. These objects, and others as will become apparent hereinafter, are accomplished by the present invention.

Basically, a refrigeration unit is provided with a manually operated fresh air vent made up of a cap assembly and a handle assembly which move together in a linear/axial direction. The handle assembly is rotatable to change the position of the fresh air vent. The fresh air vent controls both the providing of fresh air to the circulating air in the trailer and the exhausting of a portion of the circulating air. The evaporator fan is run continuously when the air vent is open to prevent the build up of gases produced by the perishable cargo.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
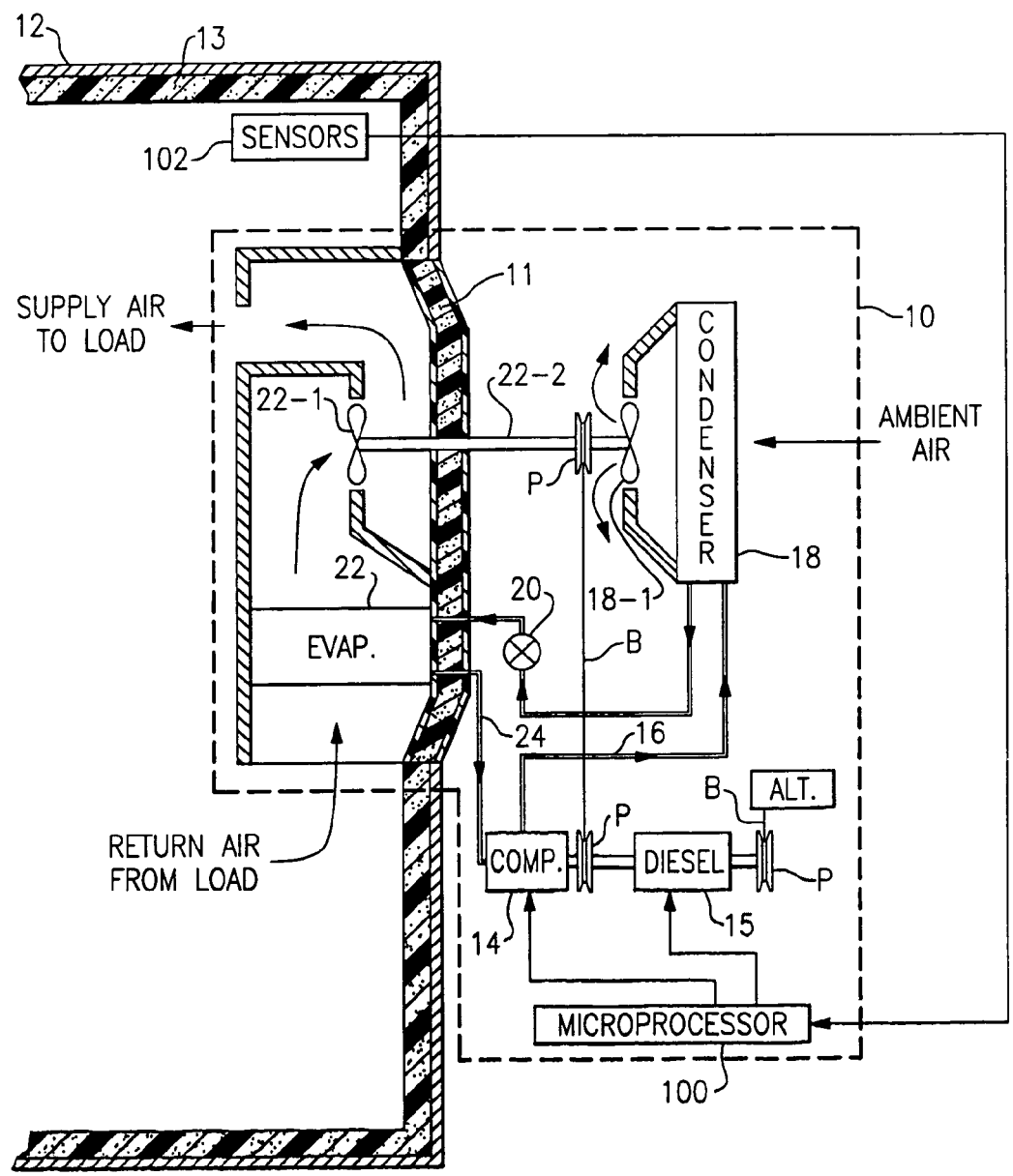
FIG. 1 is a simplified schematic diagram of a trailer and its refrigeration unit.

In FIG. 1, the numeral 10 generally designates a refrigeration unit which is mounted on a trailer 12. Insulation 11 and 13 line the pod portion of unit 10 and trailer 12, respectively, and separates the portions of refrigeration unit 10 which are located in trailer 12 from the portions located external to the conditioned area. Refrigeration unit 10 includes a fluid circuit serially including compressor 14, discharge line 16, condenser 18, expansion device 20, evaporator 22 and suction line 24. Compressor 14 is driven by diesel engine 15 under the control of microprocessor 100 responsive to inputs from sensors 102 which includes sensors for temperature, pressure, etc. Evaporator 22, evaporator fan 22-1 and a portion of evaporator fan drive shaft 22-2 are located within trailer 12 and the expansion device 20 can be within trailer 12 or just outside. Microprocessor 100 controls both compressor 14 and diesel engine 15. Diesel engine 15 directly drives compressor 14 and is connected via pulleys, P, and a belt, B, to drive shaft 22-2 for driving condenser fan 18-1 and evaporator fan 22-1, respectively. When evaporator fan 22-1 is driven it causes conditioned air from evaporator 22 to be distributed through trailer 12 and return air to be delivered back to evaporator 22. Diesel engine 15 is also connected via a pulley, P, and a belt, B, to alternator 26 which can then supply electric power, as required, to unit 10.

Figure 2:
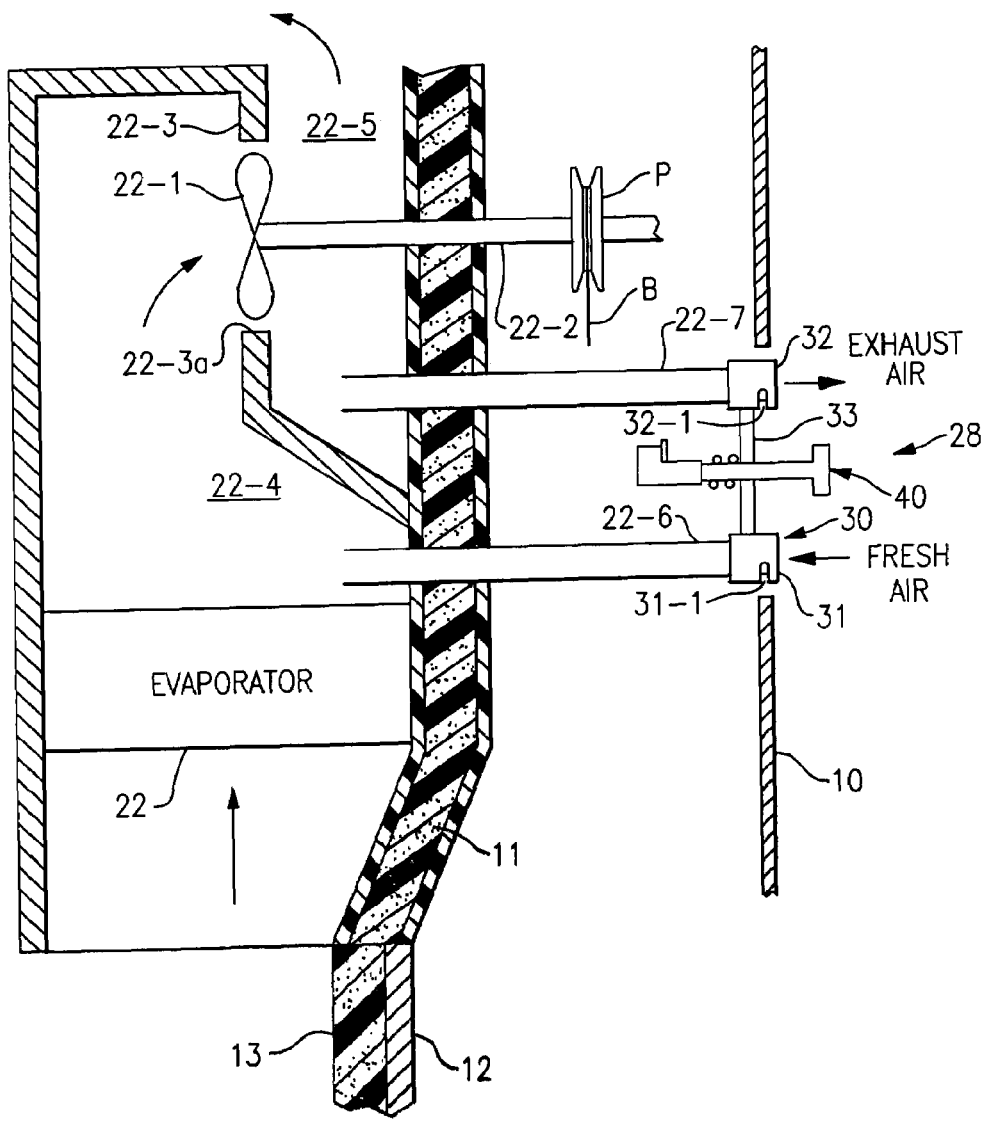
FIG. 2 is a simplified schematic representation of the fresh air vent structure.

FIG. 2 is a more detailed depiction of a portion of the FIG. 1 system adding details of the actuation of the fresh air vent structure which is collectively labeled 28. Fresh air vent structure 28 is made up of cap assembly 30 and handle assembly 40. As will be described in detail below, tubes or ducts 22-6 and 22-7, respectively, extend from points upstream and downstream, respectively, of evaporator fan 22-1 to points near to the grille of refrigeration unit 10. Caps consisting of larger tubes 31 and 32, respectively, with blanked ends and slots 31-1 and 32-1, respectively, for openings are placed over the ends of ducts 22-6 and 22-7, respectively. Caps 31 and 32 are connected by webbing 33 such that they move axially as a unit. The cap assembly 30 is made up of caps 31 and 32 and webbing 33 which are, preferably, made as, or assembled as, a single unit which is secured to handle assembly 40. When handle assembly 40 is pulled to the right, as illustrated in FIG. 2, cap assembly 30 moves also from its closed position allowing the slots 31-1 and 32-1 in the cap assembly 30 to be in fluid communication with ducts 22-6 and 22-7, respectively, to allow fresh air into, and stale air out of the trailer 12. With handle assembly 40 pulled to the right, it is then rotated to the desired setting indicated by the indicia, shown in FIG. 3A, and allowed to move to the left under the spring bias. Depending upon the rotary position of the handle assembly 40, cap assembly 30 may be open, closed or partially open.

The evaporator fan 22-1 is located in opening 22-3a of fan housing 22-3 and when operating coacts therewith to separate chamber 224 from chamber 22-5 such that chamber 224 is at evaporator fan suction pressure and chamber 22-5 is at evaporator fan discharge pressure. Note that both chambers 224 and 22-5 are downstream of evaporator 22. The first flow path defined by duct 22-6 connects to the return air path just upstream of evaporator fan 22-1 and, when cap 31 is in its open position, permits some fresh air to enter chamber 22-4. The supplying of a portion of atmospheric air through duct 22-6 is possible because the pressure in chamber 22-4 is less than ambient pressure. The second flow path defined by duct 22-7 connects to the return air path just downstream of evaporator fan 22-1 and fan housing 22-3 and, when cap 32 is in its open position, permits a portion of return air to be discharged into the atmosphere since chamber 22-5 is at fan discharge pressure which is above ambient.

The degree and duration of opening of caps 31 and 32 together with the speed of evaporator fan 22-1 determine the amount of air being exhausted and supplied. Microprocessor 100 is connected to and controls evaporator fan 22-1 through diesel 15 via belt B and pulleys P. The evaporator fan, must be run in order to produce the necessary pressure differential for drawing in fresh air and exhausting stale air.

Figures 3, 3A:
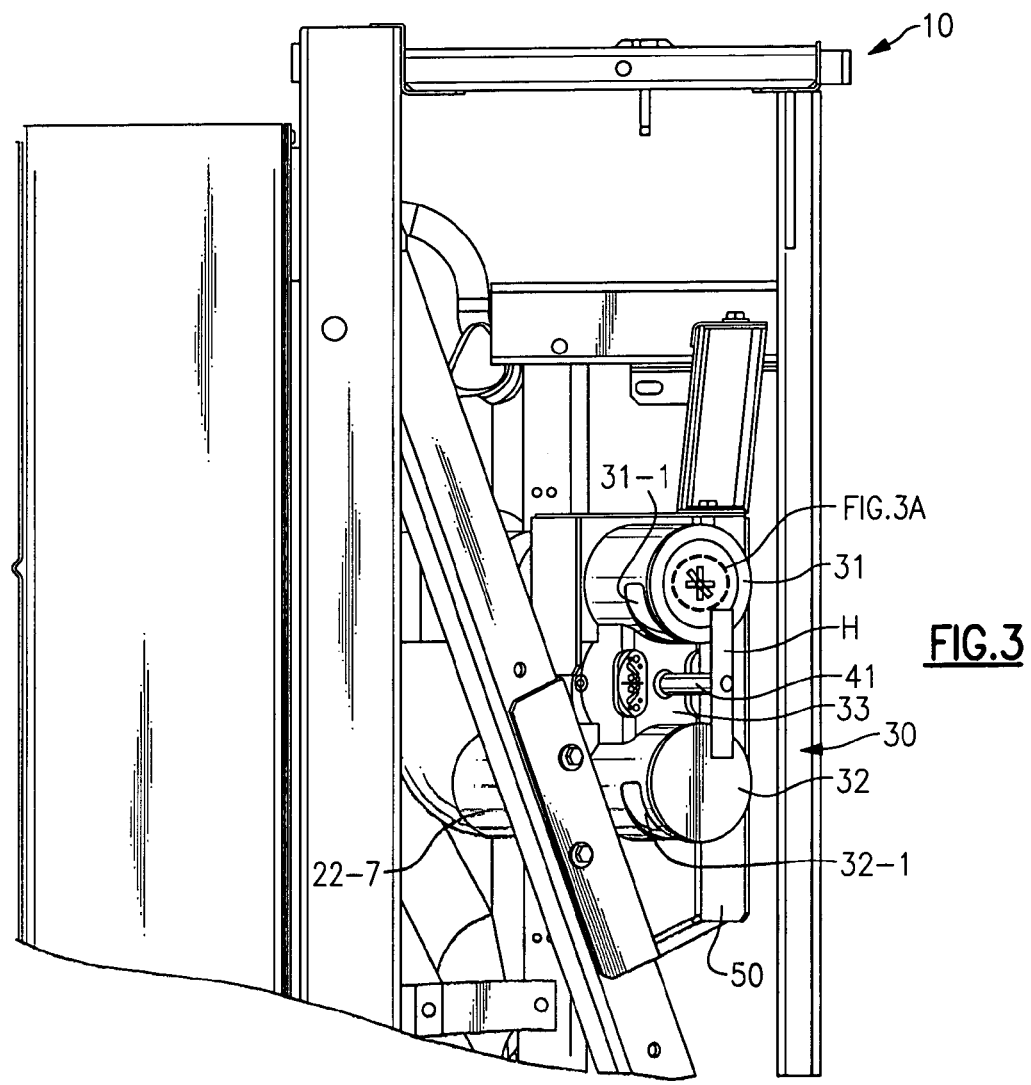
FIG. 3 is a pictorial view of the assembled fresh air vent structure.
FIG. 3A is an enlarged view of the indicia in FIG. 3.

Referring specifically to FIG. 3 which clearly shows duct 22-7 extending downwardly, it will be noted that because duct 22-7 is not straight, as depicted in FIG. 2, caps 31 and 32 are reversed from their FIG. 2 positions. Referring to FIGS. 3–6, it will be noted that caps 31 and 32 have circumferentially extending slots defining ports 31-1 and 32-1, respectively. Ports 31-1 and 32-1 are approximately 180° in extent and have a width nominally equal to the stroke of caps 31 and 32, respectively. Cap assembly 30 and handle assembly 40 are secured together and are supported by welded bracket 50 which is secured to refrigeration unit 10. Referring specifically to FIGS. 3 and 3A, it will be noted that indicia are located on cap 31 which indicate the position of the cap assembly 30 relative to the rotary position of the handle assembly 40. Specifically, handle assembly positions indicating "open", "50%", and "closed" as to the cap assembly 30 are illustrated.

Figure 5:
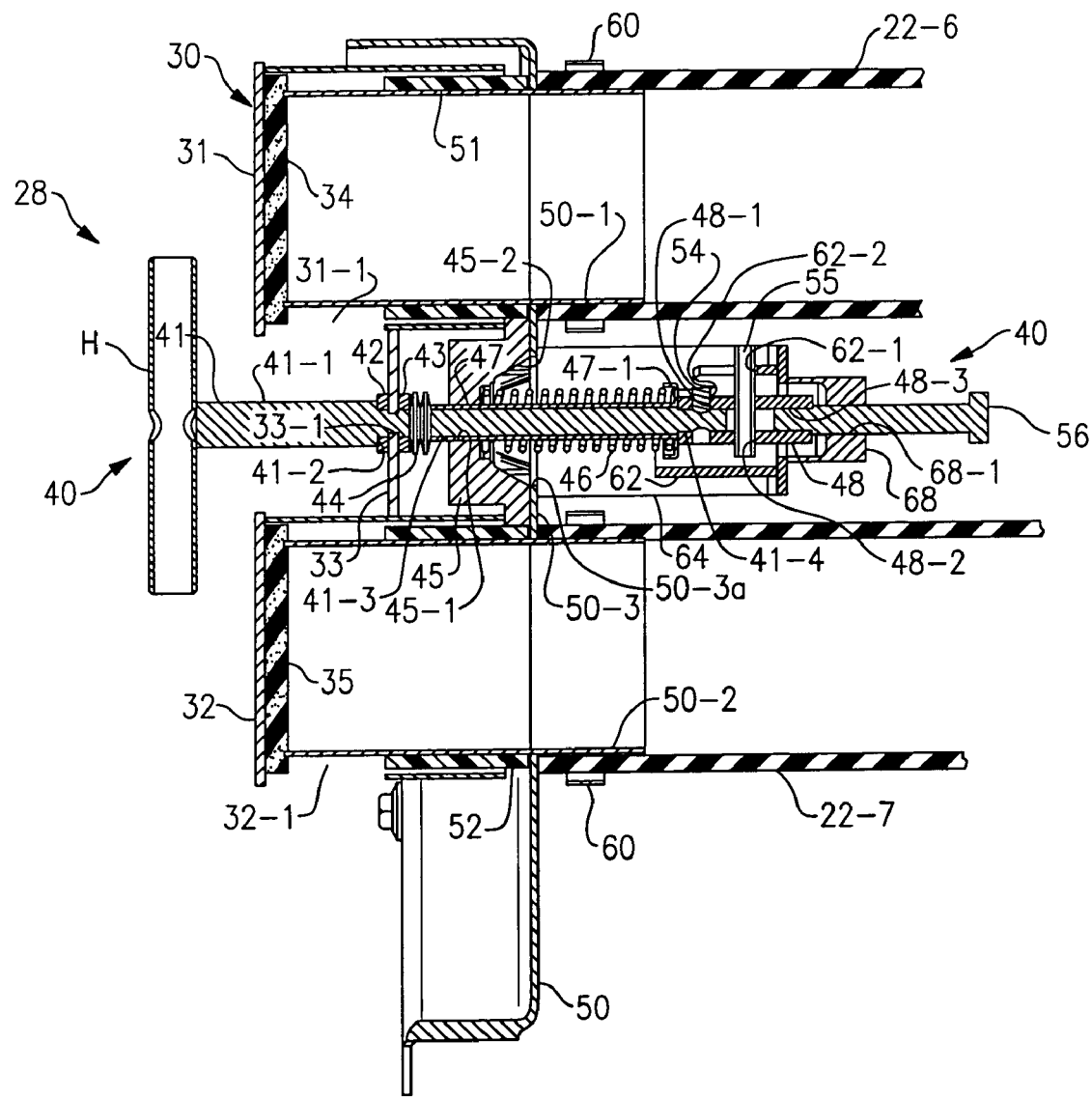
FIG. 5 is a partially cutaway view of the fresh air vent structure of FIG. 3 in the closed position.
Figure 6:
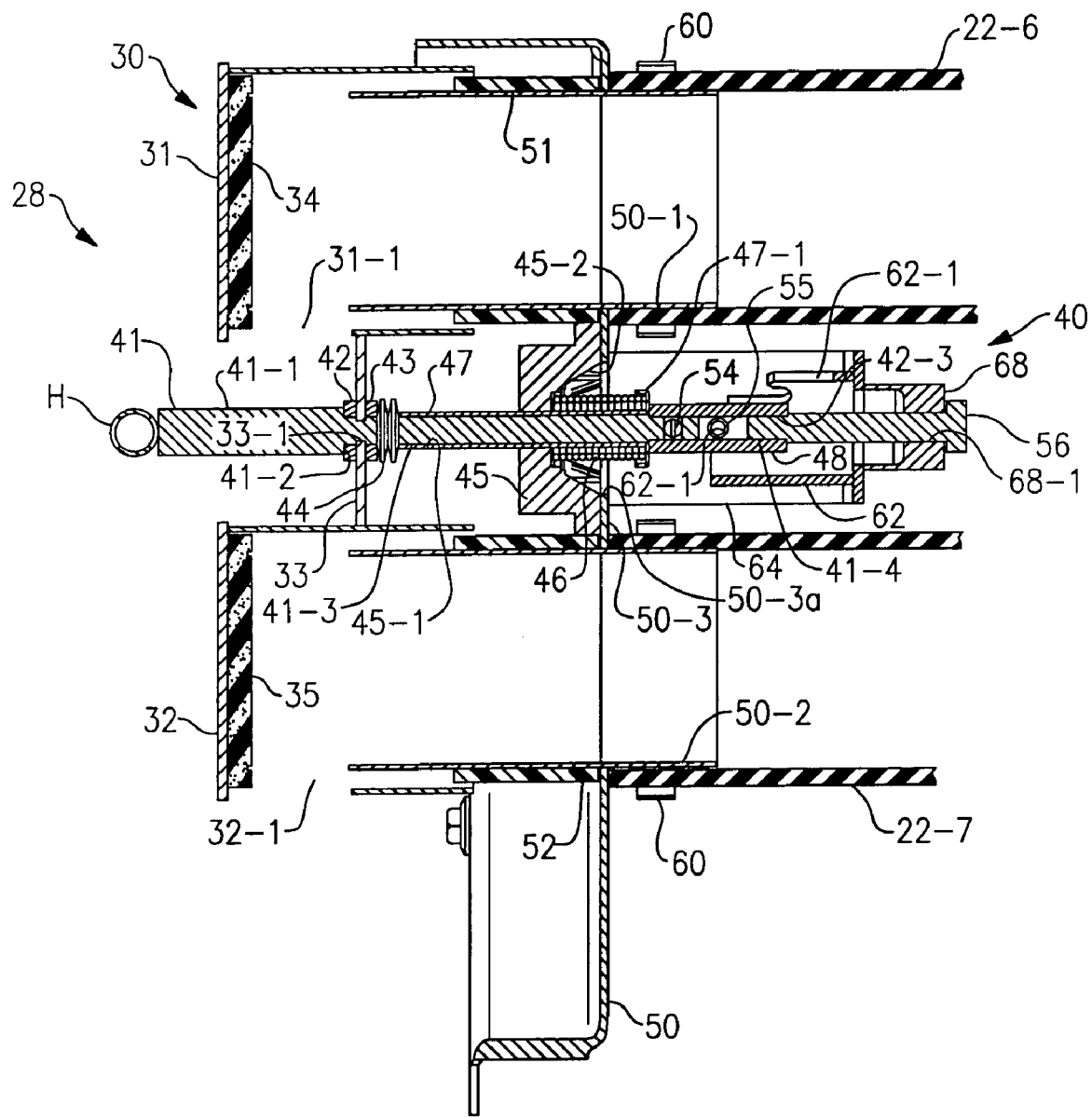
FIG. 6 is a partially cutaway view of the FIG. 5 structure in its open position.

Taking FIGS. 3, 5, and 6 together, it will be noted that bracket 50 includes tubular portions 50-1 and 50-2, to which tubes 22-6 and 22-7, respectively, are secured by clamps 60, and wall portion 50-3. Wall portion 50-3 is located between tubular portions 50-1 and 50-2 and has an aperture 50-3a therein. Plastic sleeves 51 and 52 are located on tubular portions 50-1 and 50-2, respectively. Closed cell neoprene gaskets, or other suitable resilient material, 34 and 35 line the blanked ends of caps 31 and 32, respectively. As best shown in FIG. 5, gaskets 34 and 35 seal against the outer ends of tubular portions 50-1 and 50-2, respectively, to close off air flow between the trailer 12 and the atmosphere. Sleeve 51 is located between tubular portion 50-1 and cap 31 to provide vibration isolation. Similarly, sleeve 52 is located between tubular portion 50-2 and cap 32.

Figure 4:
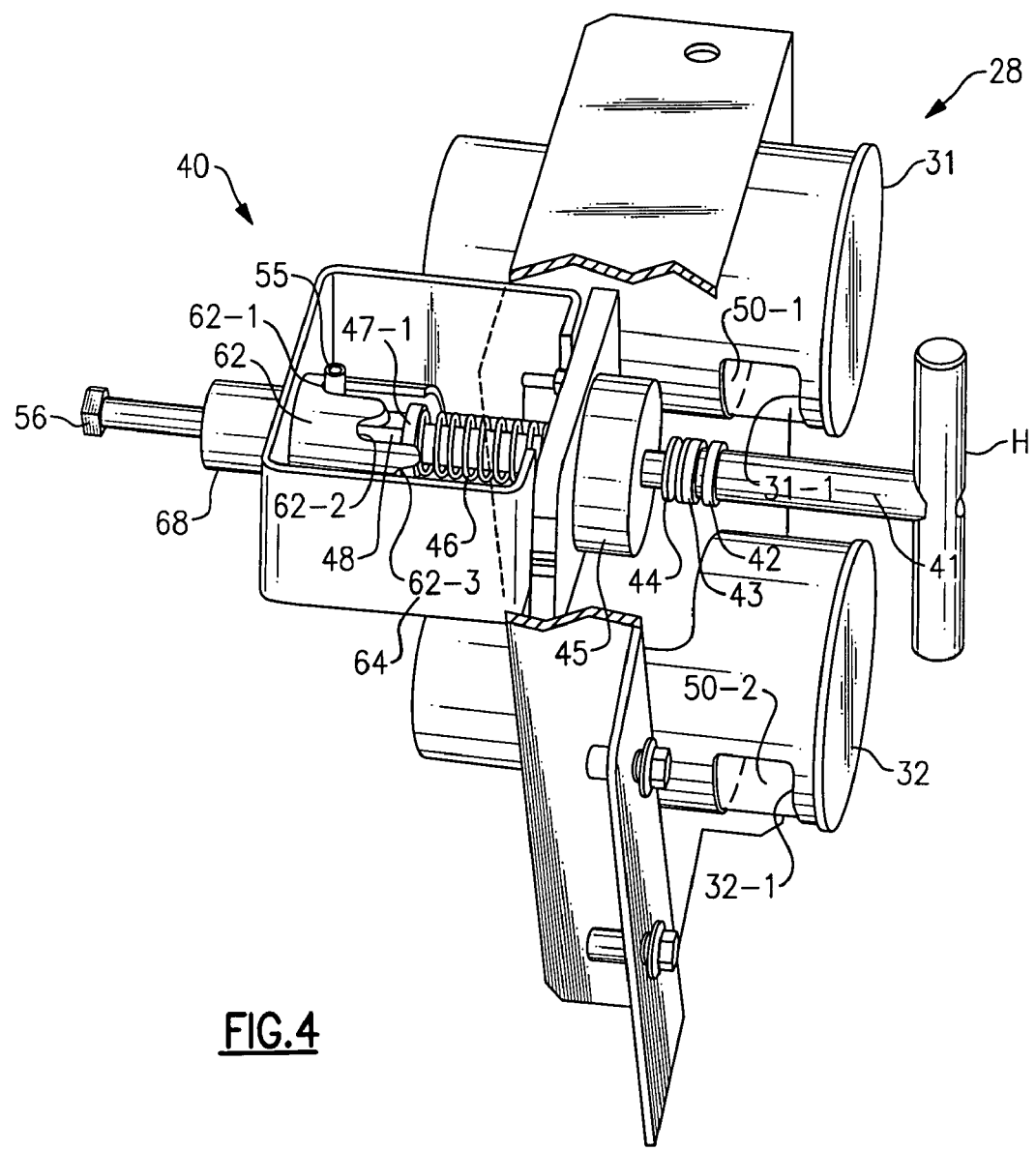
FIG. 4 is a pictorial view of the cap and handle assemblies.

Handle assembly 40 is best shown in FIGS. 4–6. Handle assembly 40 includes a shaft 41 having a large diameter section 41-1 separated from intermediate diameter section 41-3 by shoulder 41-2 and having a threaded end portion 414. A handle, H, is welded or otherwise suitably secured to the end of large diameter section 41-1. In assembling handle assembly 40, nylon washer 42 is located on the intermediate diameter section 41-3 and threaded end portion 41-4 is inserted through aperture 33-1 such that nylon washer 42 is located between shoulder 41-2 and webbing 33 of cap assembly 30. Serially, a second nylon washer 43, a stack of Belleville washers 44 which function as springs, bearing 45, coil spring 46 and stainless steel tube 47 are located on the intermediate diameter section 41-3. Bearing 45 is bolted to or otherwise suitably secured to bracket 50 and has a bore 45-1 through which one end of tube 47 passes to engage Belleville washers 44. Bearing 45 has a frustoconical recess 45-2 for receiving one end of spring 46. A spring retainer 47-1 is formed in one end of tube 47 for receiving the other end of spring 46. Hex adapter 48 is threaded onto threaded portion 41-4 of shaft 41 and engages spring retainer 47-1 and thereby tube 47. It should be clear that because tube 47 is located between hex adapter 48 and Belleville washers 44 the threading of hex adapter 4.8 on threaded portion 414 moves tube 47 to the left, as illustrated in FIG. 5, compressing both Belleville washers 44 and coil spring 46. It should be noted that Belleville washers 44 are the only significantly resilient members between the left end of tube 47, as illustrated, and shoulder 41-2 such that reducing the separation of the end of tube 47 and shoulder 41-2 by threading hex adapter 48 towards the left produces a bias acting on web 33. The compressed Belleville washers 44 acting on washer 43 and tube 47 bias handle assembly 40 into engagement with cap assembly 30 such that they move as a unit in an axial direction.

Hex adapter 48 has a first bore 48-1 which is threaded for receiving set screw 54 to hold adapter 48 in place, a second bore 48-2 for receiving roll pin 55 which extends radially therefrom, and a threaded bore 48-3 for receiving bolt 56. With specific reference to FIGS. 4 and 5, it will be noted that positioner or adapter 62 is located on hex adapter 48 in engagement with roll pin 55 and is located within and secured to bracket 64. Bearing 45 and bracket 64 are bolted or otherwise suitably connected. Bolt 56 is threaded into threaded bore 68-1 of back bearing 68 and threaded bore 48-3 of hex adapter 48. As best shown in FIG. 4, positioner or adapter 62 has a plurality of radially spaced recesses of varying axial extent 62-1, 62-2 and 62-3, respectively, as illustrated. Roll pin 55 is illustrated in recess 62-1 which represents the closed position of fresh air vent 28. If roll pin 55 is in recess 62-2, cap assembly 30 will be in the 50% open position and if roll pin 55 is in recess 62-3, cap assembly 30 will be in the full open position.

Referring to FIGS. 3–5, fresh air vent 28 and cap assembly 30 and handle assembly 40 are in the closed position. The outer ends of tubular portions 50-1 and 50-2 engage gaskets 34 and 35, respectively, in a valving action which prevents fluid communication between the atmosphere and the interior of trailer 12 via ducts 22-6 and 22-7, respectively. Roll pin 55 is in recess 62-1 of bushing 62. Belleville washers 44 and spring 46 are in their greatest extension permitted by hex adapter 48 at this time. Because handle H is rigidly connected to hex adapter 48, when handle H is pulled outward it causes hex adapter 48 and tube 47 to move therewith as a unit. The Belleville washers 44 retain the same degree of bias because tube 47 maintains the same positioning with respect to Belleville washers 44 but spring 46 is compressed between bearing 45 and spring retainer 47-1 which moves towards bearing 45 permitting handle assembly 40 and the attached cap assembly 30 to move outward in an opening direction for the cap assembly 30. By rotating handle H in accordance with the indicia on cap 32 illustrated in FIG. 3A, upon release of handle H, roll pin 55 can be positioned to return to recess 62-1 to close the fresh air vent 28, to recess 62-2 to put fresh air vent 28 in the half open position, or to recess 62-3 which is the fully open position of the fresh air vent 28 as shown in FIG. 6.

When handle H is pulled outward and rotated from the closed to the open position, the fresh air vent 28 will move from the closed position of FIGS. 3–5 to the full open position of FIG. 6 thereby opening cap assembly 30. Because cap assembly 30 is secured to shaft 41, outward movement of handle assembly 40 causes cap assembly 30 to move to the FIG. 6 position, or to an intermediate open position, in which gaskets 34 and 35 are moved from their seating position on the ends of tubular portions 50-1, and 50-2, respectively, opening slots 31-1 and 32-1, respectively.

With fan 22-1 running and cap assembly 30 in the open position of FIG. 6, chamber 224 is on the suction side of fan 22-1 and is therefore at less than ambient pressure. Accordingly, fresh air enters slot 31-1, passes through tubular portion 50-1 and duct 22-6 into chamber 224 where the fresh air mixes with air circulating in the trailer 12. The mixture of fresh and stale recirculating air is drawn from chamber 224 by fan 22-1 and is discharged into chamber 22-5 at a pressure which is greater than atmospheric. Accordingly, a mixture of stale recirculating air and a smaller amount of fresh air pass from chamber 22-5 into duct 22-7 serially passing through tubular portion 50-2 and slot 32-1 into the atmosphere. The remaining air delivered to chamber 22-5 by fan 22-1 circulates through trailer 12.

Figure 7:
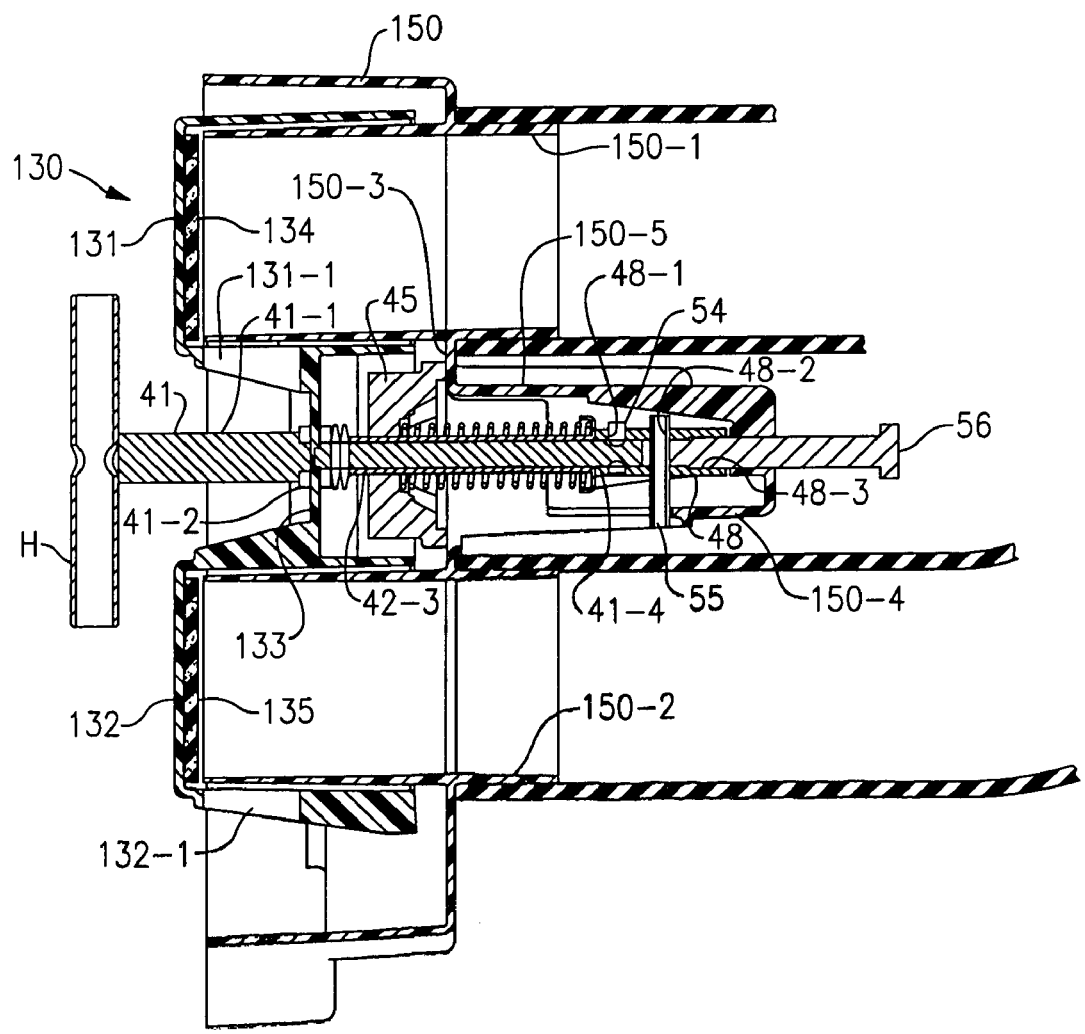
FIG. 7 is a partially cutaway view of modified fresh air vent structure in the closed position.
Figure 8:
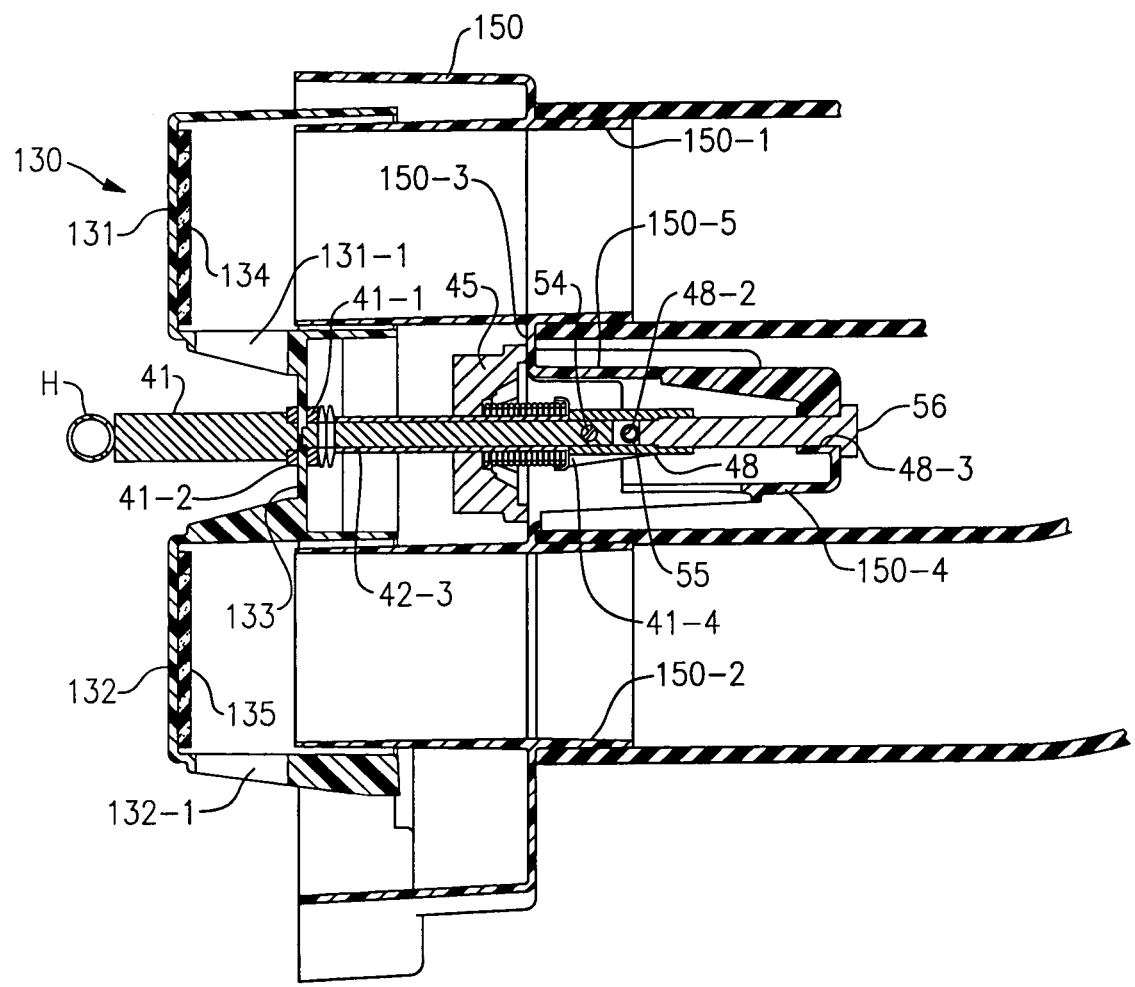
FIG. 8 is a partially cutaway view of a portion of the FIG. 7 structure in the open position.

The structure illustrated in FIGS. 7 and 8 differs from the structure of FIGS. 3–6 in that the cap structure 30 of FIGS. 3–6 is made up of a plurality of parts 31, 32, 33 which are welded or otherwise suitably assembled. Cap structure 130 of FIGS. 7 and 8 has portions 131, 132 and 133 made as a single piece of plastic or metal which has been molded or stamped out and caps 131 and 132 have slots 131-1 and 132-1 and are lined by gaskets 134 and 135, respectively. Additionally, FIGS. 7 and 8 make bracket 50, the adapter 62, bracket 64 and back bearing 68 of the FIGS. 3–6 device as a single piece. Bracket 150 includes tubular portions 150-1 and 150-2 and wall portion 150-3 as well as positioner/adapter portion 150-4 which corresponds to adapter 62 and portion 150-5 which corresponds to bracket 64. Sleeves 51 and 52 are eliminated. So the embodiment of FIGS. 7 and 8 operates the same as the embodiment of FIGS. 3–6 and differs only in the bracket, cap, adapter and back bearing structure with parts being combined. The modified structure has been numbered 100 higher except where combined parts had plural separate numbers.

In operation, refrigeration unit 10 will operate under the control of microprocessor 100 to maintain the conditions in trailer 12 within a desired narrow range and to provide a history of conditions in trailer 12, as is conventional. The running of evaporator fan 22-1 when fresh air vent 28 is open permits the drawing in of fresh air into the recirculating air and exhausting some of the stale recirculating air.

Although preferred embodiments of the present invention have been illustrated and described, other changes will occur to those skilled in the art. For example, the Belleville washers may be replaced with wavy springs. Also, because the Belleville washers are used to provide a bias to hold the parts in contact such that they move as a unit, the location of the Belleville washers can be on either side of the webbing 33 since they need only be located between shoulder 41-2 and the end of spring 47. It is therefore intended that the scope of the present invention is to be limited only by the scope of the appended claims.

What is claimed is:

1. A refrigeration unit for conditioning and circulating air in a trailer, said refrigeration unit including an evaporator fan located downstream of an evaporator and a microprocessor for controlling and recording conditions in said trailer, said refrigeration unit further including:
   said fan producing a suction pressure upstream thereof and a discharge pressure downstream thereof;
   two flow paths between said interior of said trailer and ambient atmosphere surrounding said trailer;
   manually operated means for simultaneously controlling discrete positions between and including closed and fully open positions of said two flow paths between said interior of said trailer and said ambient atmosphere surrounding said trailer;
   a first one of said two flow paths is for supplying atmospheric air to air returning from circulating, in said trailer and extends from a point which is just upstream of said fan and which is at suction pressure and said ambient atmosphere whereby atmospheric air is supplied to circulating air;
   a second one of said two flow paths is for discharging circulating air from said trailer to said ambient atmosphere and extends to said ambient atmosphere from a point which is just downstream of said fan and which is at discharge pressure;
   said manually operated means including valve means which seat on and are axially reciprocatable with respect to respective portions of said two flow paths and manually positionable means secured to said valve means so as to be axially reciprocatable therewith and, additionally, rotatable with respect thereto for setting the position of said manually operated means.

2. The refrigeration unit of claim 1 wherein said manually positionable means includes a first member having a plurality of circumferentially spaced recesses having different axial extents and a second member axially and rotatably moveable with respect to said first member and having a radially extending portion adapted to be selectively received in said spaced recesses for variably positioning said valve means.

3. The refrigeration unit of claim 1 wherein said valve means includes a pair of caps with blanked ends having openings therein and connected by a webbing such that both caps move as a unit.

4. The refrigeration unit of claim 3 wherein said caps are lined with resilient material which is biased against the ends of tubes forming outermost portions of said two flow paths when said valve means is closed.

5. The refrigeration unit of claim 3 wherein said pair of caps and said webbing are made as a single piece.

* * * * *